United States Patent [19]

Berquist

[11] Patent Number: 5,315,074
[45] Date of Patent: May 24, 1994

[54] METHOD AND APPARATUS FOR IMPLANTING GEOPHONES INTO THE EARTH

[75] Inventor: Richard J. Berquist, Houston, Tex.

[73] Assignee: Input/Output, Inc., Stafford, Tex.

[21] Appl. No.: 21,324

[22] Filed: Feb. 23, 1993

[51] Int. Cl.⁵ .......................................... G10K 11/00
[52] U.S. Cl. .................................. 181/0.5; 367/191; 175/19
[58] Field of Search ........................ 367/191; 181/0.5; 175/19, 22

[56] References Cited

U.S. PATENT DOCUMENTS

| | | | |
|---|---|---|---|
| 3,106,258 | 10/1963 | Muller | 175/19 |
| 3,186,502 | 6/1965 | Rademacher | 175/67 |
| 3,242,999 | 3/1966 | Garner | 175/19 |
| 3,352,369 | 11/1967 | Bodine, Jr. | 175/19 |
| 4,838,379 | 6/1989 | Maxwell | 181/122 |
| 5,007,031 | 4/1991 | Erich, Jr. | 367/178 |

Primary Examiner—J. Woodrow Eldred
Attorney, Agent, or Firm—Bush, Moseley & Riddle

[57] ABSTRACT

An apparatus (10) for implanting geophones (98) includes an implanting device (12) pivotally mounted on the end of a tractor (14) for movement from one predetermined location to another predetermined location for implanting a plurality of geophones (98). The implanting device (12) has a main support frame (16) supporting a vibratory frame (18) which receives a push tube (68) in sliding relation. The lower end of the push tube (68) accepts a geophone (98) for insertion therein. Downward movement of push tube (68) implants the geophone (98) as shown in FIG. 4. To assist in implanting the geophone (98), the vibratory frame (18) and the push tube (68) are vibrated for vibration of the lower end of the push tube (68) during implantation.

27 Claims, 5 Drawing Sheets

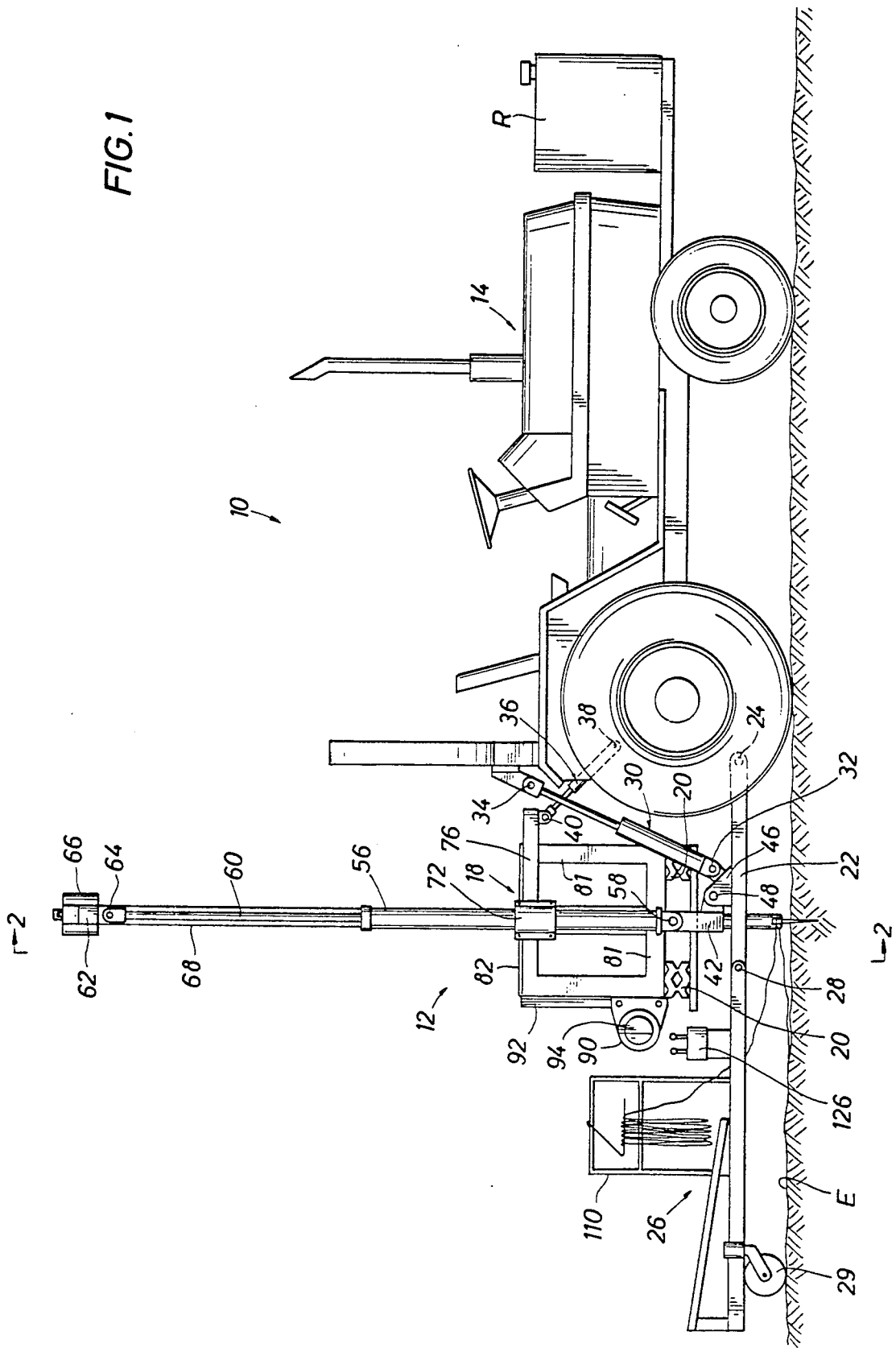

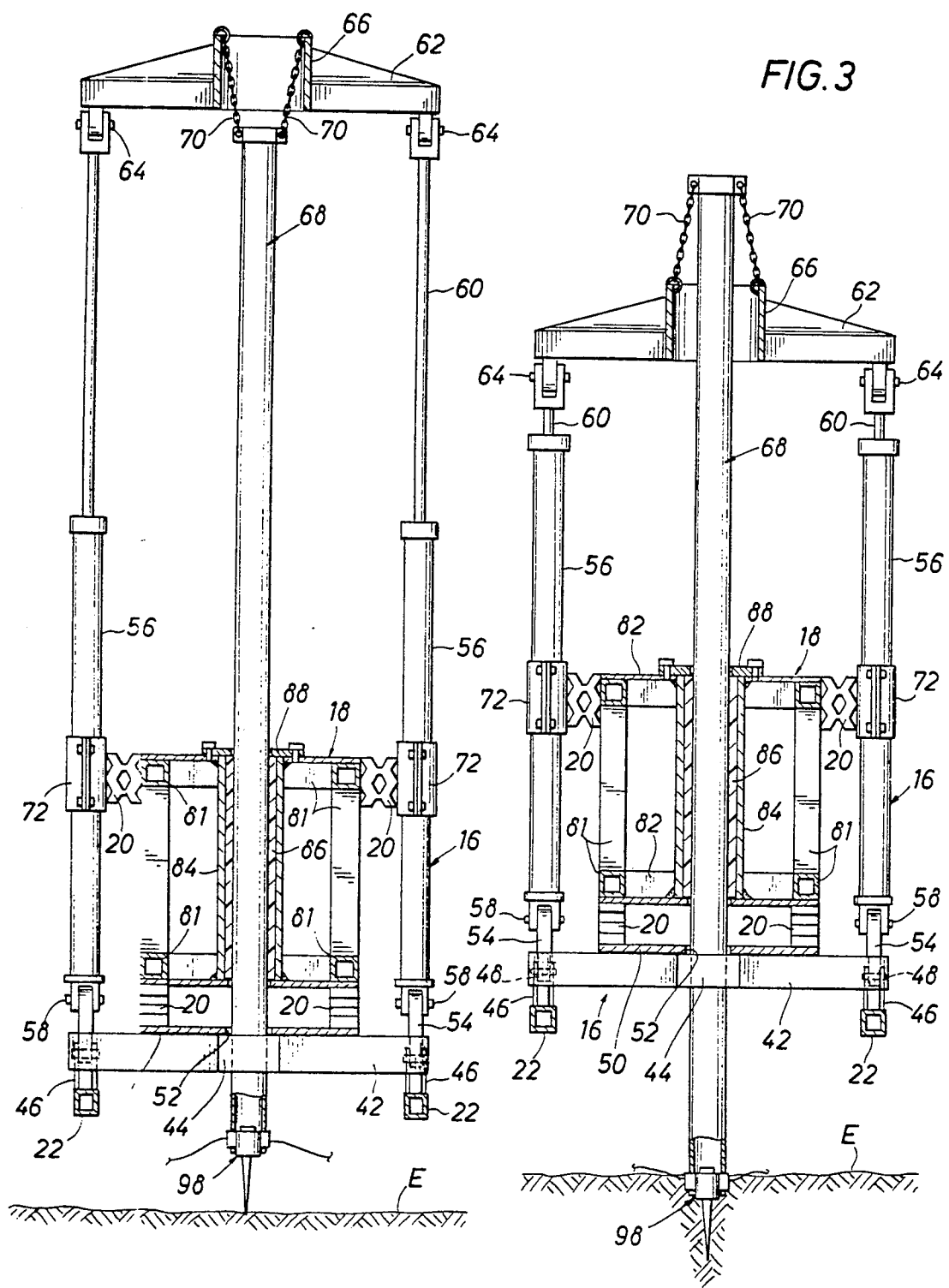

METHOD AND APPARATUS FOR IMPLANTING GEOPHONES INTO THE EARTH

FIELD OF THE INVENTION

This invention relates to a method and apparatus for implanting geophones into the earth for the detection of seismic waves.

BACKGROUND OF THE INVENTION

Heretofore, an apparatus has been provided for implanting geophones into the earth for the detection of seismic waves. For example, U.S. Pat. No. 4,838,379 dated Jun. 13, 1989 and U.S. Pat. No. 5,007,031 dated Apr. 9, 1991 show manually actuated geophone implanting tools. Normally, as shown in U.S. Pat. No. 5,007,031 a hole is first dug in the earth to receive the geophone at a predetermined location. Then, after properly inserting the geophone within the hole, a spike on the geophone is manually driven into the bottom of the hole for anchoring the geophone. It is time consuming to first dig the holes for the geophones and then to position and anchor the geophones within the holes manually by hammering the geophones into the holes.

It is difficult to obtain manually the precise level and alignment of the geophone when implanted in the earth in order to obtain accurate measurements of the seismic activity. It is desirable in most instances that the geophones be positioned along an accurate vertical axis regardless of the slope of the earth surface. To obtain such an accurate positioning with manual tools is time consuming, and such manual tools sometimes result in a possible error in the desired alignment and positioning.

SUMMARY OF THE INVENTION

The present invention is directed to a method and apparatus for implanting geophones into the earth for the detection of reflected seismic signals, and particularly to a mobile apparatus for implanting geophones mounted on a self propelled vehicle for movement from one predetermined location to another predetermined location for the implanting of a plurality of geophones in a predetermined pattern.

The geophone implanting apparatus includes a push member, preferably a tube having means at its lower end to detachably receive a geophone therein. Force exerting means including a pair of hydraulic fluid cylinders push the tube and entire geophone downwardly into the earth and vibratory means vibrate the tube during its pushing thereby to facilitate the implanting of the geophone into the earth at a desired depth without digging or providing a separate hole. The weight of the apparatus is exerted on the tube during the pushing action for assisting in pushing it and the geophone downwardly into the hole without providing any separate holes for receiving the geophones. The tube is mounted on a frame which may be adjusted to maintain the tube in a vertical position.

For vibrating the push tube, a vibratory frame is mounted on a plurality of resilient pads secured to a main support frame. A tubular sleeve on the vibratory frame receives the push tube for relative sliding movement. Upon energizing of a vibrator secured to the vibratory frame, the vibrator frame and push tube vibrate relative to the main frame to assist in pushing the geophone downward into the earth to a predetermined depth. For pushing the tube downwardly, a cross beam on the extending end of a pair of parallel piston rods exerts a downward force on the upper end of the tube to push it downwardly. A flexible connection extends between the tube and cross beam so that relative lateral movement of the tube is permitted during vibration of the tube.

It is an object of this invention to provide a method and apparatus for implanting geophones into the earth in which a mobile apparatus is used for movement to a plurality of predetermined geophone locations for implanting the geophones.

It is a further object of this invention to provide such an apparatus and method for implanting a geophone into the earth without separately digging or forming a hole to receive the geophone.

It is another object to provide an apparatus and method for implanting geophones into the earth in which a geophone is mounted on the lower end of a push member such as a tube which is mechanically pushed a predetermined depth into the earth for implanting the geophone.

Another object of this invention is to provide an implanting device for a geophone which simultaneously pushes and vibrates the geophone during implantation within the earth thereby to facilitate the implantation.

Other features, advantages, and objects of this invention will become more apparent after referring to the following specification and drawings.

BRIEF DESCRIPTION OF THE DRAWINGS

FIG. 1 is a side elevational view of the apparatus comprising the present invention for implanting geophones into the earth with the implanting device shown in a position with the geophone initially engaging the earth;

FIG. 2 is an end elevational view of the implanting device shown in FIG. 1 with the vibratory frame shown in section prior to implanting of the geophone and taken generally along line 2—2 of FIG. 1;

FIG. 3 is an end elevational view similar to FIG. 2 but showing the implanting device with the push tube forcing the geophone into the earth;

DESCRIPTION OF THE INVENTION

Figure 4:
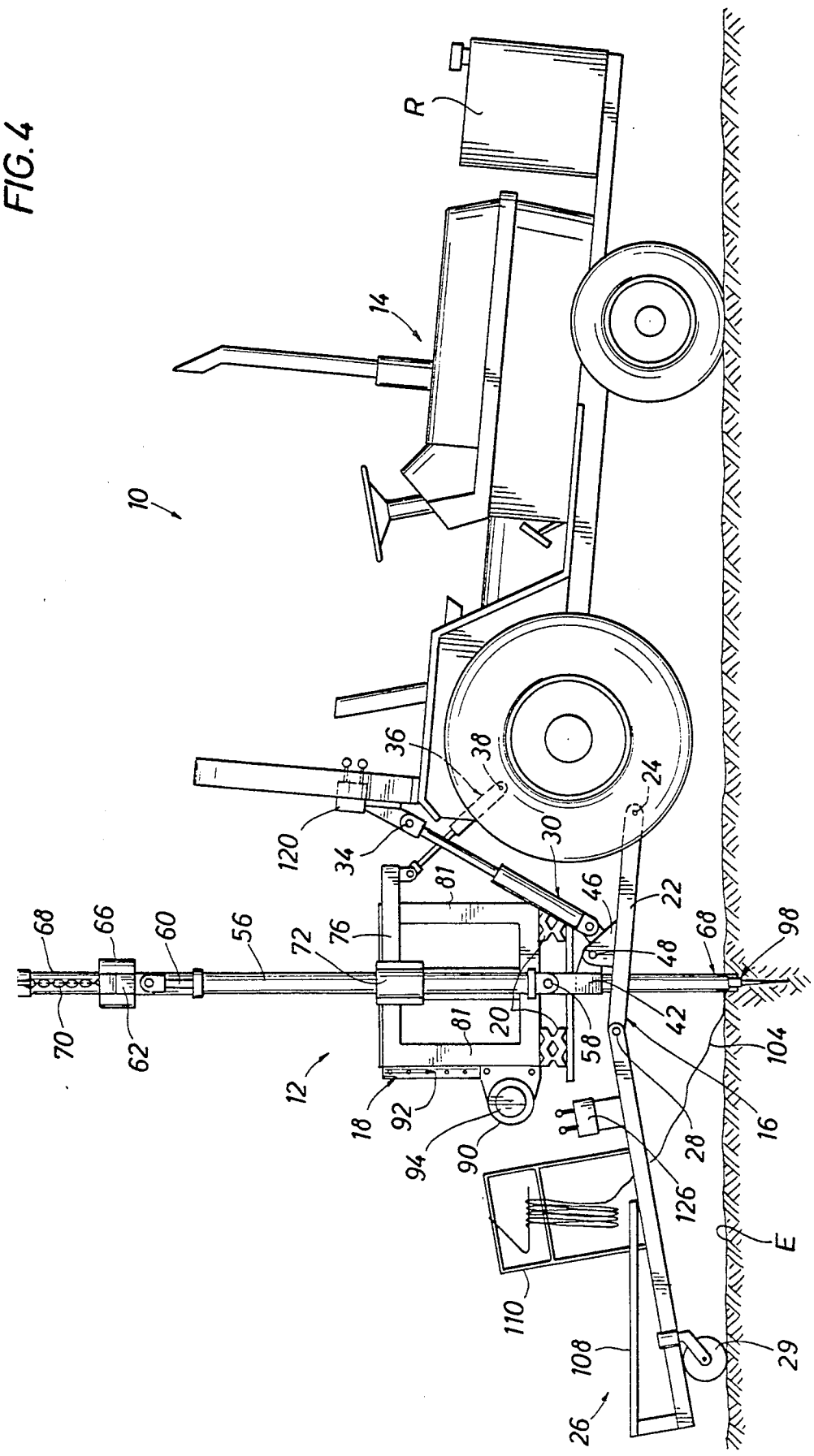
FIG. 4 is a side elevational view of the apparatus of FIG. 1 but showing the apparatus in the implanting position of the geophone shown in FIG. 3.
Figure 5:
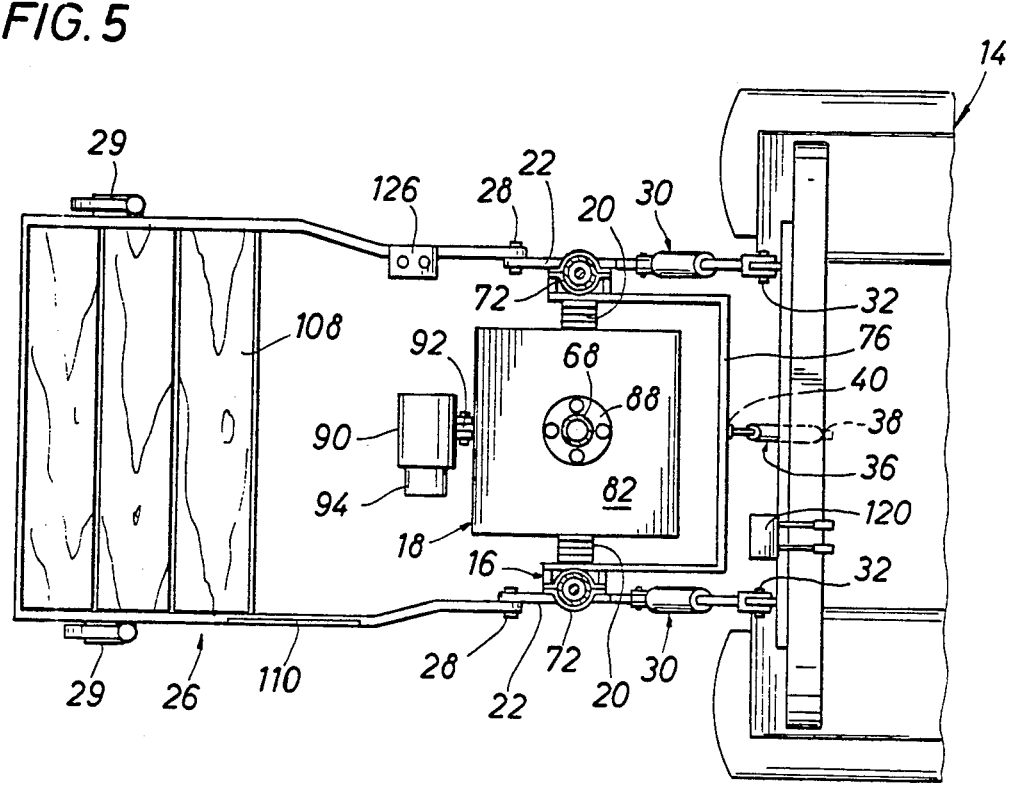
FIG. 5 is a top plan of the implanting device connected to the rear end of a tractor and showing a seat for supporting an operator in a seated position.

Referring now to the drawings for a better understanding of the invention and particularly to FIGS. 1-5, the apparatus is shown generally at 10 including a geophone implanting device generally indicated at 12 pivotally mounted on the rear end of a tractor generally indicated at 14 forming a mobile self propelled vehicle for implanting device 12. Implanting device 12 includes a main support frame generally indicated at 16 and a vibratory frame generally indicated at 18 which is supported on main frame 16 by a plurality of rubber or elastomeric pads shown generally at 20. Lower frame members or arms 22 have inner ends pivotally connected at 24 to the rear end of the frame of tractor 14. A rear trailer generally indicated at 26 is pivotally connected at 28 to the rear end of frame member 22 on main support frame 16 and has supporting wheels 29. A pair of hydraulic cylinders 30 are pivotally connected at 32 to main support frame 16 and at 34 to the rear of tractor 14 for raising and lowering main frame 16. Hydraulic cylinder 36 is pivotally connected at 38 to the rear end of tractor 14 and at 40 to main support frame 16 for tilting of vibratory frame 18 in a generally vertical plane. Pivots at 24, 32, 34, 38, and 40 form a suspension system for pivotally connecting implanting device 12 to the rear end of tractor 14.

Main support frame 16 has a transverse supporting beam 42 which includes an integral collar 44 as shown particularly in FIGS. 2 and 3. Brackets 46 secured to longitudinally extending arms 22 mount beam 42 for relative limited pivotal movement with vibratory frame 18 about pivots 48. A lower support plate 50 is secured to cross beam 42 and has a central opening 52 therein. Cross beam 42 has a pair of upwardly extending extensions 54 thereon. A pair of parallel hydraulic cylinders 56 are pivotally connected at 58 to extensions 54 and have upwardly extending piston rods 60. An upper cross beam 62 is pivotally connected at 64 to the upper ends of piston rods 60 and has an integral collar 66 centrally of its length. Received within collar 66 is a push member or tube generally indicated at 68. A pair of opposed chains 70 extend between cross beam 62 and push tube 68 for raising and lowering push tube 68 as shown in FIGS. 2 and 3 and as will be explained further herein.

A pair of sleeves 72 are fixed to cylinders 56. A U-shaped arm 76 as shown particularly in FIG. 5 extends between and is secured to sleeves 72. Cylinder 36 is pivotally connected at 40 to arm 76 and to the rear of tractor 14 at pivot 38 (see also FIGS. 1 and 4). Lower cross beam 42, collar 44, plate 50, cylinders 56, upper cross beam 62, and U-shaped arm 76 define an intermediate frame between support arms 22 of main frame 16 and vibratory frame 18 supported on pivots 48 of main support arms 22 for limited relative pivotal movement.

The intermediate frame supports vibratory frame 18 and moves with vibratory frame 18 during tilting relative to main support arms 22 upon actuation of cylinder 36. Vibratory frame 18 is connected by four lower rubber blocks or pads 20 to lower plate 50 and by two side rubber pads 20 secured to fixed collars 72 on cylinders 56. Vibratory frame 18 includes a box-shaped frame formed by frame members 81 and upper and lower plates 82 secured to adjacent frame members 81. A sleeve 84 extends between central openings in plates 82 and is secured to plates 82. A plastic bearing insert 86 is positioned within sleeve 84. A cover plate 88 is removably connected to upper plate 82 to permit replacement of bearing insert 86 with wear.

Push tube 68 with relative sliding movement, contacts bearing insert 86 and is guided by insert 86. A vibrator 90 which includes a hydraulically activated eccentric is mounted on a mounting bar 92 secured to adjacent frame members 81 and may be adjusted vertically along mounting bar 92 in order to obtain optimum vibratory movement of vibratory frame 18. A hydraulic motor 94 is connected to vibrator 90 for rotation of the eccentric thereof. Upon actuation of vibrator 90, vibratory frame 18 vibrates push tube 68 relative to main support frame 16 and adjacent cylinders 56 with rubber pads 20 absorbing the vibrating motion in shearing, compressive, and tensile movements.

Figure 6:
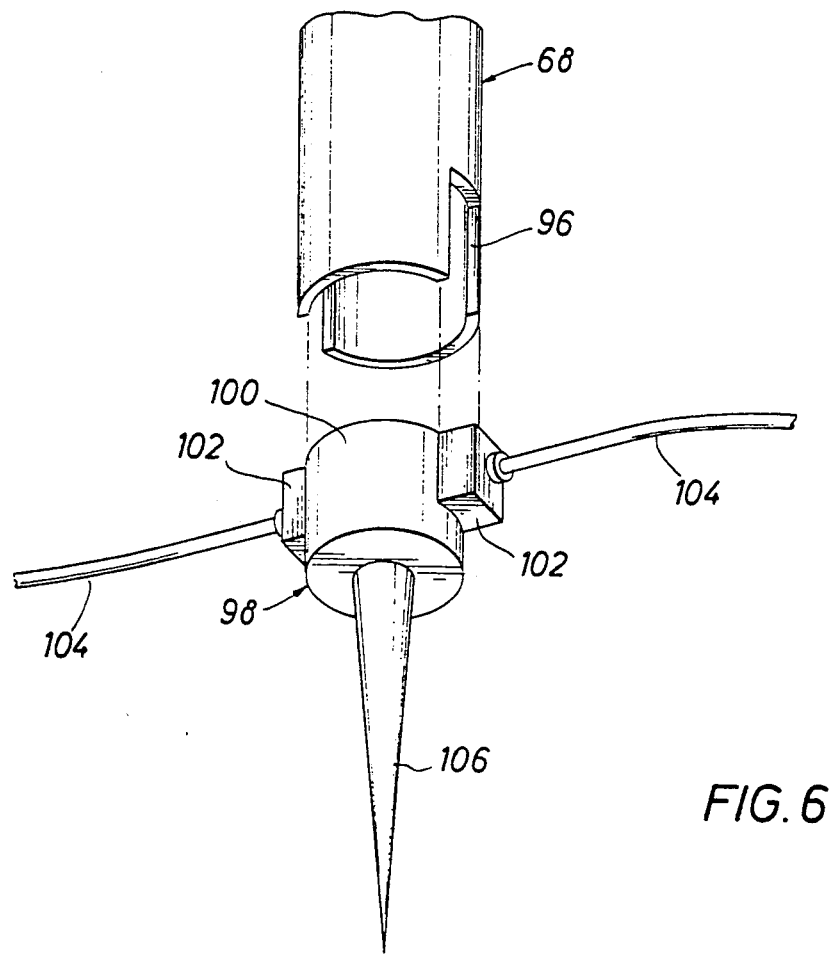
FIG. 6 is an enlarged exploded view of the lower end of the push tube with the geophone removed therefrom.

Referring particularly to FIG. 6, the lower end of push tube 68 is slotted at 96 to receive a geophone generally indicated at 98. Geophone 98 has a body 100 with lugs 102 extending laterally therefrom and connected to electrical leads 104 having ends connected to apparatus (not shown) for measuring the seismic waves received by geophone 98 as well known. A prong or spike 106 extends downwardly from body 100 to facilitate entry into the earth. Trailer 26 (see FIGS. 1, 4, and 6) has a seat 108 on which an operator (not shown) of implanting device 12 may be seated. A plurality of geophones 98 may be stored on a rack 110 on trailer 26 accessible to the operator. A hand held tool (not shown) may be used for gripping a geophone 98 below lugs 102 and then inserting lugs 102 within slot 96. Geophone 98 is manually maintained in slot 96 by the tool until prong 106 penetrates the earth upon downward movement of push tube 68 at which time the manually operated tool may be removed.

It is to be understood that various means may be provided for positioning a geophone on the lower end of a push member or tube for implantation. For example, an automatic feed mechanism for a plurality of geophones stacked in a magazine might be used with a plunger type mechanism for positioning the geophone on the lower end of a push tube for implantation. Also, various types of catch and release devices could be mounted on the end of push tube 68 for releasably retaining a geophone thereon.

Figure 7:
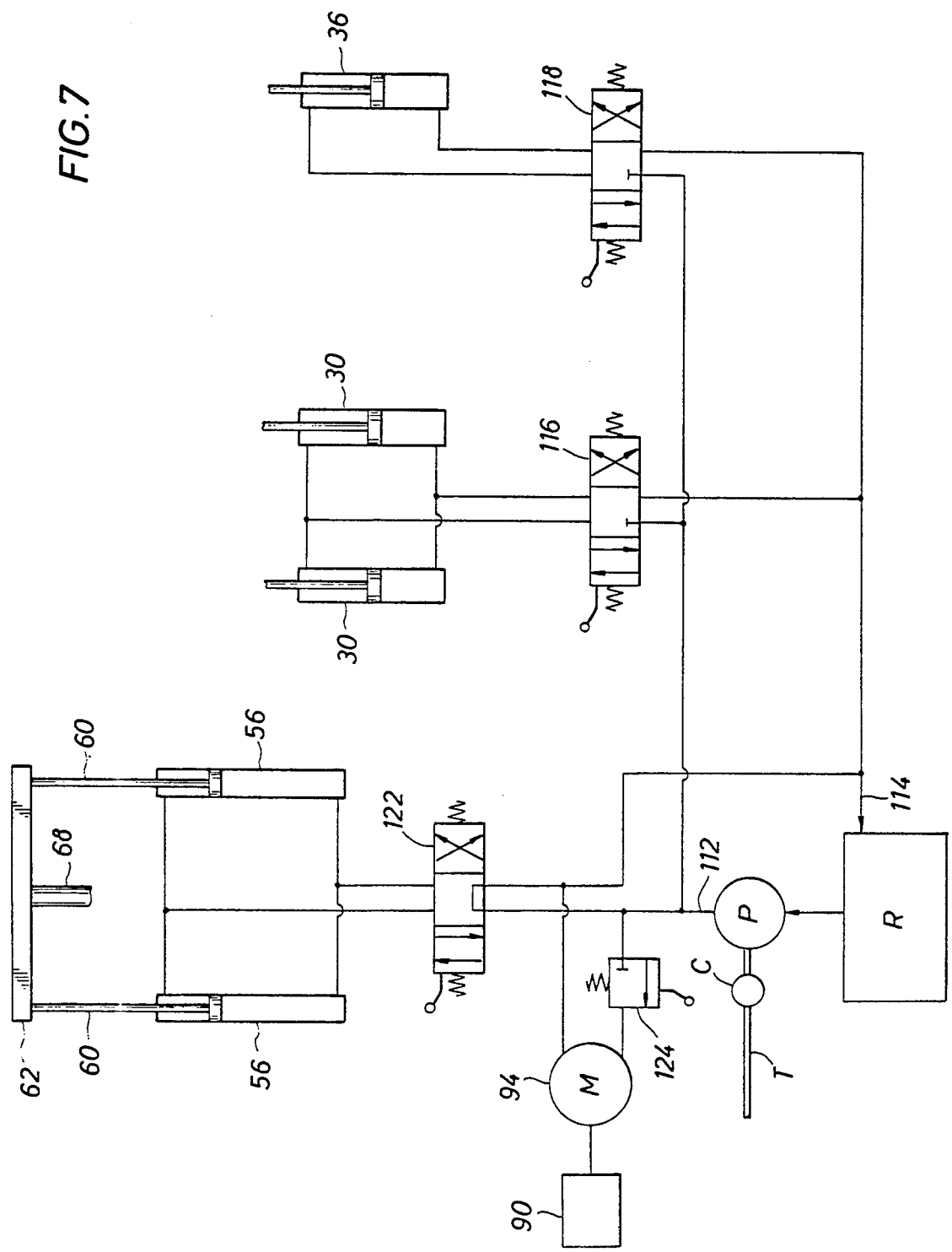
FIG. 7 is a schematic of the hydraulic fluid system.

Referring now to FIG. 7 in which the hydraulic fluid system of the implanting apparatus 12 is shown schematically, a hydraulic fluid reservoir is shown at R to supply hydraulic fluid to a pump P and may be mounted on the front end of tractor 14 as shown in FIGS. 1 and 4. Pump P is driven from the power take-off of tractor 14 shown at T and having a connection C therebetween to permit limited relative movement of pump P. Fluid is supplied from hydraulic pump P through line 112 and returned to reservoir R through line 114. Three way valve 116 controls the flow of hydraulic fluid to cylinders 30 and three way valve 118 controls the flow of hydraulic fluid to cylinders 30 and 36 control the raising and lowering of main frame 16 and the tilting of vibratory frame 18 to a vertical position relative to main frame 16. The driver of tractor 14 controls the movements of main frame 16 and vibratory frame 18 from suitable controls shown at 120 in FIGS. 4 and 5. Three way valve 122 controls the raising and lowering of push tube 68. Valve 124 controls the operation of motor 94 for vibrator 90. Valves 122 and 124 are manually controlled by the operator of implanting device 12 seated on seat 108 from suitable controls shown at 126 in FIGS. 4 and 5.

In operation, with support frame 16 in a raised position and the lower end of push tube 68 raised from the ground or earth E about eighteen (18) inches, the operator of implanting device 12 seated on seat 108 grips a geophone 100 to be implanted with a hand held tool (not shown) below lugs 102 and places the geophone within slot 96 of tube 68. Next, the driver of tractor 14 lowers main frame 16 by actuation of cylinders 30 until prong 106 is near the ground or earth surface E. It is normally desirable to implant geophone 98 in a vertical direction in earth E. Consequently, cylinder 36 is actuated by the driver of tractor 14 to position vibratory frame 18 along with the intermediate frame and push tube 68 in a vertical relation. Then, the operator for implanting device 12 actuates cylinders 56 to lower push tube 68 with the geophone 98 retained within slot 96 by the hand tool until prong 106 penetrates the surface of the earth a desired amount, such as three inches. Such distance is normally sufficient to retain the geophone position. The hand tool is then removed and cylinders 56 are actuated to push geophone 98 into the earth.

As seen in FIG. 4, actuation of cylinders 56 when geophone 98 penetrates the earth lifts tractor 14. The weight of tractor 14 is partially transferred to force push tube 68 into earth E. To assist further in implanting geophone 98, hydraulic motor 94 and vibrator 90 are energized by actuation of valve 124 by the operator of implanting apparatus 12 to vibrate vibratory frame 18 and push tube 68. Vibration of push tube 68 by contact of bearing insert 86 on vibratory frame 18 vibrates the lower end of tube 68 to assist in the implantation of geophone 98 as is particularly desirable with hard earth surfaces. Chains 70 as shown in FIG. 3 provide a flexible connection between the upper end of tube 68 and cross beam 62 to permit limited lateral movement of tube 68 relative to cylinders 56.

After implantation of geophone 98, push tube 68 is lifted by cylinders 56 with chains 70 in the position of FIG. 2. As geophone 98 slidably fits within the open end of push tube 68, geophone 98 remains implanted upon raising of push tube 68. When push tube 68 is raised, tractor 14 is returned to the ground surface and may be driven to another predetermined location for implantation of another geophone.

While vibratory frame 18 has been illustrated for relative movement in a vertical plane, it is to be understood that the vibratory frame and push tube could, if desired, be mounted on a ball or trunnion mount for relative movement in any desired direction. Also, implant apparatus 12 could be formed integrally with a mobile vehicle for movement from one location to another location as desired. While a pushing member in this specification has been described as a tube, other structures such as a rod, a bar etc. could equivalently serve as a pushing member.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. Apparatus for inserting a plurality of geophones into the earth at spaced selected surface locations comprising:
    a self propelled vehicle adapted for travel along the surface of the earth;
    an implanting device for the geophones mounted on said self propelled vehicle for travel with said vehicle along the surface of the earth; said device including:
    a push tube having means at its lower end detachably receiving a geophone for insertion within the earth;
    means to selectively raise and lower said push tube;
    force exerting means for exerting a downward force on said push tube and geophone thereon for pushing the lower end of the tube with the geophone thereon to a desired depth into the earth for implanting the geophone; and
    means to vibrate selectively said push tube with said geophone relative to said force exerting means.

2. Apparatus as set forth in claim 1 wherein said implanting device includes,
    a main frame;
    a vibratory frame for said push tube;
    a plurality of resilient mounts between said vibratory frame and said main frame; and
    means to vibrate said vibratory frame and tube relative to said main frame.

3. Apparatus as set forth in claim 2 wherein
    said vibratory frame includes a sleeve receiving said tube in a horizontal direction and permitting relative sliding movement of said tube;
    said sleeve contacting said tube along a portion of its length during vibration of said vibratory frame for vibrating said tube.

4. Apparatus as set forth in claim 3 wherein
    a vibrator is mounted on said vibratory frame for selective vibration of said vibratory frame and push tube.

5. Apparatus as set forth in claim 1 wherein
    said implanting device includes a main frame having force exerting means for engaging an upper end portion of said tube for transferring a downward pushing force against said tube; and
    power means are operatively connected between said main frame and said force exerting means to provide a downward pushing force against said tube by said force exerting means.

6. Apparatus as set forth in claim 5 wherein upon actuation of said power means for lowering of said push tube, said push tube contacts the earth and lifts said main frame from the earth thereby partially applying the weight of said main frame against said push tube for exerting a downward force to implant the geophone.

7. Apparatus as set forth in claim 5 wherein
    said power means comprises a pair of spaced vertically extending cylinder and piston combinations; and
    a horizontal cross beam extends between the upper extending ends of said spaced cylinder and piston combinations for exerting a force against said upper end portion of said tube for pushing said tube downwardly.

8. Apparatus as set forth in claim 7 wherein flexible means on said cross beam are connected to the upper end portion of said tube for transferring forces between said cross beam and said tube thereby to permit limited lateral movement between said cross beam and said upper end portion of said tube.

9. Apparatus as set forth in claim 1 wherein
    mounting means are provided on a rear end of said self propelled vehicle for mounting said implanting device.

10. Apparatus as set forth in claim 9 wherein
    said mounting means includes
    means pivotally connecting said implanting device to said self propelled vehicle for relative pivotal movement in a generally vertical direction.

11. Apparatus as set forth in claim 10 wherein
    said self propelled vehicle comprises a tractor and said implanting device is pivotally connected to the rear end of said tractor.

12. An implanting device for implanting geophones into the earth adapted for propelled travel along the surface of the earth; said device including:
    an elongate push member having means at its lower end detachably receiving a geophone for implantation;

means to selectively raise and lower said push member;

vibratory means contacting the outer surface of said push member along its length for selectively vibrating said push member with said geophone therein in a generally horizontal direction; and force exerting means for exerting a downward force on said push member upon contact with the earth during implantation of said geophone for pushing the lower end of the push member with the geophone thereon to a desired depth within the earth for implanting the geophone.

13. An implanting device as set forth in claim 12 wherein said implanting device includes a main frame;

a vibratory frame for said push member; and a plurality of resilient mounts between said vibratory frame and said main frame to permit vibratory movement of said vibratory frame and push member relative to said main frame.

14. An implanting device as set forth in claim 13 wherein said force exerting means comprises fluid actuated means operatively connected between said main frame and said force exerting means to effect a downward pushing force against said push member and geophone thereon by said force exerting means.

15. A self propelled implanting device for implanting geophones into the earth at spaced selected surface locations; said implanting device comprising:

a self propelled vehicle;

support frame means mounted on said vehicle;

a push tube on said support frame means having means at its lower end for receiving a geophone therein for implantation;

means on said frame means to selectively raise and lower said push tube; said means upon contact of said push tube with a surface location effecting raising at least a portion of said self propelled vehicle; and force exerting means utilizing the weight of said self propelled vehicle for exerting a downward force on said push tube upon contact with the earth during implantation of said geophone for pushing the lower end of the tube with the geophone thereon to a desired depth within the earth for implantation.

16. A self propelled implanting device as set forth in claim 15 wherein said support frame means includes a main frame;

a vibratory frame for the push tube; and a plurality of resilient mounts between said vibratory frame and said main frame to permit vibratory movement of said vibratory frame and tube relative to said main frame.

17. A self propelled implanting device as set forth in claim 15 wherein said force exerting means applies a downward force against an upper end portion of said tube and comprises fluid cylinder means operatively connected between said main frame and the upper end portion of said tube to effect a downward pushing force against said tube and geophone thereon for implanting the geophone in the earth.

18. A self propelled implanting device as set forth in claim 15 wherein means are provided on said implanting device to support an operator in seated relation; and said tube has a lower end forming a pocket to receive a geophone, said geophone being dimensioned for manual placement within said pocket by said operator in a raised position of said tube.

19. A self propelled implanting device as set forth in claim 18 wherein means are provided on said implanting device for storing a plurality of geophones at a location accessible to the operator.

20. A method of implanting a plurality of geophones into the earth at spaced selected surface locations comprising the steps of, providing a mobile implanting device for travel along the surface of the earth and stopping at a desired location for implanting a geophone;

providing a push tube on said device for pushing a geophone into the earth at the desired location;

positioning a geophone on the lower end of the push tube;

providing force exerting means for exerting a downward force against said push tube upon engagement with the earth;

pushing the lower end of said push tube and geophone thereon downwardly within the earth to a predetermined depth for implanting the geophone; and selectively vibrating said tube and geophone thereon when said tube is being pushed into the earth to facilitate downward movement of the push tube and geophone therein into the earth.

21. The method as set forth in claim 20 further including the steps of:

lifting said push tube from the earth after implantation of the geophone;

moving said mobile implanting device mechanically along the surface of the earth to another desired location for a geophone;

inserting another separate geophone within the lower end of said push tube; and pushing said tube and geophone downwardly with said force exerting means for implanting the separate geophone within the earth.

22. The method as set forth in claim 20 wherein the step of positioning a geophone on the lower end of the push tube includes manually inserting a geophone within the lower end of the push tube and manually maintaining said geophone within the push tube until the geophone engages the earth upon downward movement of the push tube.

23. A method of implanting a plurality of geophones into the earth at spaced selected surface locations comprising the steps of, providing a mobile implanting device for travel along the surface of the earth and stopping at a desired location for implanting a geophone;

providing a push tube on said device for pushing a geophone into the earth at the desired location;

manually inserting a geophone within the lower end of the push tube and manually maintaining said geophone within the push tube until the geophone engages the earth upon downward movement of the push tube.

providing force exerting means for exerting a downward force against said push tube upon engagement with the earth; and pushing the lower end of said push tube and geophone thereon downwardly within the earth to a predetermined depth for implanting the geophone.

24. A method of implanting a geophone into the earth comprising the steps of, providing an implanting device for implanting a geophone at a desired location in the earth;

providing a push member on said implanting device for pushing a geophone into the earth at the desired location;

positioning a geophone on the lower end of the push member;

providing mechanical force exerting means for exerting a downward force against said push member for pushing the lower end of said push member and geophone downwardly within the earth to a predetermined depth;

providing vibratory means for vibrating said push member in a horizontal direction relative to said force exerting means; and pushing said push member downwardly with said mechanical force exerting means while selectively vibrating said push member with said vibratory means.

25. The method as set forth in claim 24 further including the steps of:

lifting said push member from the earth after implantation of the geophone;

moving said implanting device mechanically along the surface of the earth to another desired location for a geophone;

positioning another separate geophone on the lower end of the push member;

pushing said member downwardly into the earth with said force exerting means; and selectively vibrating said push tube member and geophone while being pushed into the earth.

26. Apparatus for inserting a plurality of geophones into the earth at spaced selected surface locations comprising:

a self propelled vehicle adapted for travel along the surface of the earth;

an implanting device for the geophones mounted on said self propelled vehicle for travel with said vehicle along the surface of the earth; said device including:

a push tube having means at its lower end detachably receiving a geophone for insertion within the earth;

means to selectively raise and lower said push tube;

a main frame having force exerting means for engaging an upper end portion of said tube for exerting a downward force on said push tube and geophone thereon for pushing the lower end of the tube with the geophone thereon to a desired depth into the earth for implanting the geophone;

a pair of vertically extending cylinder and piston combinations operatively connected between said main frame and said force exerting means to provide a downward pushing force against said tube by said force exerting means; and a horizontal cross beam extending between the upper extending ends of said spaced cylinder and piston combinations for exerting said downward force against said upper end portion of said tube for pushing said tube downwardly.

27. The method as set forth in claim 22 including the step of supporting an operator of said implanting device in a seated position; and providing a tool for said operator in order to hold a geophone for manual positioning within the lower end of said tube.

* * * * *